United States Patent
Kuba

[11] Patent Number: 5,812,100
[45] Date of Patent: Sep. 22, 1998

[54] IMAGE DISPLAY APPARATUS

[75] Inventor: Keiichi Kuba, Hachioji, Japan

[73] Assignee: Olympus Optical Co., Ltd., Tokyo, Japan

[21] Appl. No.: 457,375

[22] Filed: Jun. 1, 1995

[30] Foreign Application Priority Data

Jun. 1, 1994 [JP] Japan .................................... 6-119961

[51] Int. Cl.$^6$ ............................................. G09G 5/00
[52] U.S. Cl. ............................................. 345/8; 359/630
[58] Field of Search .................... 345/7, 8; 348/115, 348/53; 340/980; 434/94; 359/13, 630, 738, 638

[56] References Cited

U.S. PATENT DOCUMENTS

| | | | |
|---|---|---|---|
| 4,269,476 | 5/1981 | Gauthier et al. | |
| 4,818,045 | 4/1989 | Chang . | |
| 4,994,794 | 2/1991 | Price et al. | 345/7 |
| 5,266,930 | 11/1993 | Ichikawa et al. | 345/8 |
| 5,539,578 | 7/1996 | Togino et al. | 345/8 |

FOREIGN PATENT DOCUMENTS 3191389  8/1991  Japan .

*Primary Examiner*—Regina Liang
*Attorney, Agent, or Firm*—Cushman,Darby & Cushman IP Group of Pillsbury Madison & Sutro LLP

[57] ABSTRACT

A compact, lightweight and wide-field head-mounted image display apparatus which is capable of projecting an image overflowing with a sence of immersion. The apparatus includes an LCD (1), a beam splitter prism (5) having a half-mirror (3) which is disposed at a tilt at an intersection between the optical axis of the LCD (1) and the observer's visual axis to lead an image ray bundle emanating from the LCD (1) to a pupil (4) of an observer's eyeball, and a concave mirror (2) which is provided on a surface of the prism (5) on the side thereof which is remote from the LCD (1). Thus, after entering the prism (5), the image displayed on the LCD (1) is successively reflected by the concave mirror (2) and the half-mirror (3) and then enters the eyeball (4). The effective apertures of the half-mirror (3), the concave mirror (2) and the beam splitter prism (5) are reduced, thereby making the image of the periphery of the image display device unsharp, and thus providing dynamic presence.

21 Claims, 12 Drawing Sheets

8

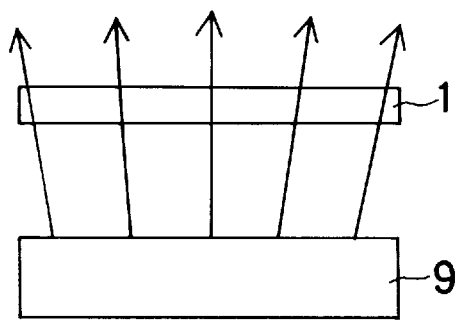
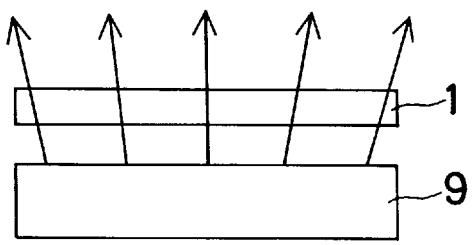
FIG.13(a)   FIG.13(b)
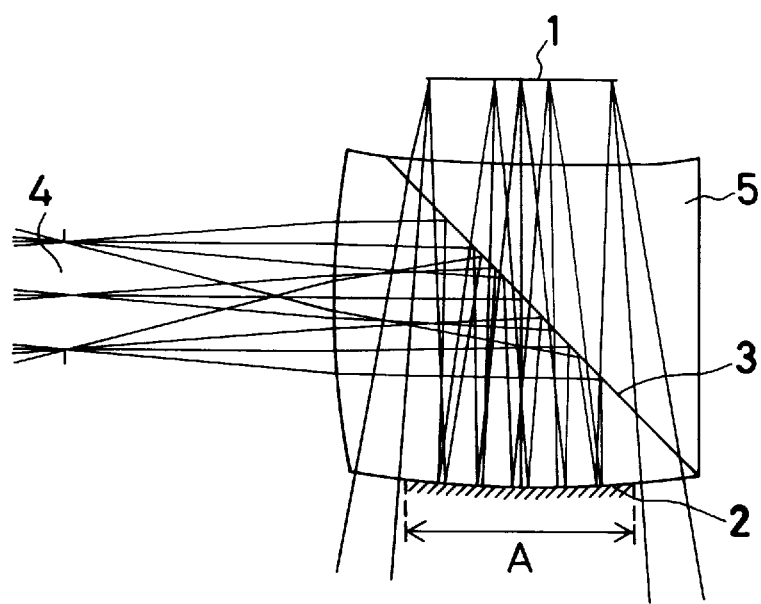
FIG. 14

IMAGE DISPLAY APPARATUS

BACKGROUND OF THE INVENTION

The present invention relates to an image display apparatus and, more particularly, to a compact head- or face-mounted image display apparatus which is retained on the user's head or face to project an image into his or her eyeball.

In recent years, helmet- and goggle-type head- or face-mounted image display apparatuses, which are designed to be retained on the user's head or face, have been developed for the purpose of enabling the user to enjoy virtual reality or a wide-screen image personally.

For example, Japanese Patent Application Laid-Open (KOKAI) No. 3-191389 (1991) discloses an optical system including, as shown in FIG. 20, a two-dimensional display device 1 for displaying an image, a concave mirror 2 provided to face the display device 1 to project the displayed image into an observer's eyeball 4 as an enlarged image, and a half-mirror 3 disposed between the display device 1 and the concave mirror 2, thereby enabling the optical system to be arranged in a compact structure while maintaining favorable image forming performance. In U.S. Pat. No. 4,269,476, as shown in FIG. 21, a beam splitter prism 5 having a half-mirror 3 is used.

Incidentally, whatever ocular optical system is used, if the most peripheral region of the image display area is sharply projected, the boundary between the image display area and the non-image display area is clearly displayed, thus impairing the dynamic presence of the displayed image. Since in many cases a field stop which corresponds to the image display area is used, the image of the field stop is formed, and the boundary of the image display area is undesirably observed. In this case, the image for observation is displayed in a black background, causing the dynamic presence to be impaired to a considerable extent.

Further, whatever ocular optical system is used, when the principal ray in a ray bundle emanating from the most peripheral region of the image display area is projected into an observer's eyeball, the image of the most peripheral region of the image display area is formed. As a result, a framed image is displayed, causing the dynamic presence to be impaired.

Further, some problems arise if it is intended to widen the field of view of the optical system on the assumption that the image of the whole image display area is to be projected for the observer without vignetting. The problems will be explained by taking the conventional ocular optical systems shown in FIGS. 20 and 21 as examples. There are two methods of widening the field of view of the conventional ocular optical systems shown in FIGS. 20 and 21: ① one in which the size of the two-dimensional display device 1 is increased; and ② the other in which the focal length f of the optical system 2 is reduced.

With the method ①, however, it is necessary to increase not only the size of the two-dimensional display device 1 but also the size of an optical element such as the half-mirror 3 or the prism 5. Accordingly, the apparatus increases in both overall size and weight, which is unfavorable for a head-mounted image display apparatus. Further, when the apparatus is designed for observation with both eyes in particular, the achievement of a wider field of view is limited because of interference between two optical systems for both eyes.

When the method ② is employed to widen the field of view of an optical system arranged as shown in FIG. 21, the optical system becomes complicated and large in size because for the need of correcting aberrations which increase as the field of view becomes wider. In addition, when the method ② is employed to widen the field of view of an optical system arranged as shown in FIG. 20 or 21, the field curvature (negative Petzval sum) and positive comatic aberration produced by the concave mirror 2 increase, giving rise to a problem. To solve the problem, it may be considered to use a back-coated mirror, in which a reflecting surface is provided on the back surface of a lens, in place of the concave mirror 2 so as to increase the capability of correcting aberrations such as field curvature and coma and to improve the durability of the mirror. With this method, however, chromatic aberration is produced by the refracting lens.

If a doublet D is used as a refracting lens, as shown in FIG. 22, chromatic aberration can be corrected, but the overall size and weight of the apparatus increase, which is unfavorable for a head-mounted image display apparatus. The optical system shown in FIG. 22 uses an LCD 1 having a diagonal of 1.3 inches, and enables observation at a horizontal field angle of 44° and a vertical field angle of 33.2°. However, since the optical system is arranged to form an image of the whole image display area without vignetting, the size of the prism 5 is exceedingly large, i.e., at least about 32 mm×26 mm×38 mm.

The method ② further involves the following problem: If the focal length of the optical system is reduced with the size of the two-dimensional display device 1 maintained at a constant level, the spacing between the eyeball 4 and the half-mirror 3 (i.e., the working distance of the optical system) reduces, so that it becomes difficult for the user to use the apparatus with his or her glasses on. Further, there is a limit to the achievement of a wider field of view.

In any case, problems arise if it is intended to widen the field of view of the optical system on the assumption that the image of the whole image display area is to be projected for the observer without vignetting.

SUMMARY OF THE INVENTION

In view of the above-described problems of the conventional techniques, an object of the present invention is to provide a compact, lightweight and wide-field head-mounted image display apparatus which is capable of projecting an image overflowing with dynamic presence.

To attain the above-described object, the present invention provides an image display apparatus including an image display device, an ocular optical system for projecting an image displayed by the image display device, and a contrast reducing device whereby the contrast of the peripheral region of the image is made lower than the contrast of the central region of the image.

In addition, the present invention provides an image display apparatus having an apparatus body unit which includes an image display device, and a support member which enables the apparatus body unit to be fitted to the observer's face or head. The apparatus body unit includes an ocular optical system for leading an image displayed by the image display device to an eyeball of the observer fitted with the apparatus body unit, and a contrast reducing device whereby the contrast of the peripheral region of the image is made lower than the contrast of the central region of the image.

In this case, the contrast reducing device may be arranged to allow the image to become gradually darker from a predetermined position of the image display device as the distance therefrom increases toward the periphery of the image display device, thereby making the image of the periphery of the image display device unsharp.

The contrast reducing device may also be arranged such that resolution of the image gradually deteriorates from a predetermined position of the image display device as the distance therefrom increases toward the most peripheral region of the image display device.

The ocular optical system may have a half-mirror and a concave mirror.

The ocular optical system may be arranged such that an outside-world image is displayed superimposed on the periphery of the image of the image display device.

The reason for adopting the above-described arrangements and the functions thereof will be explained below.

Whatever ocular optical system is used, if the image of the most peripheral region of the image display device is formed with favorable image forming performance, the boundary (frame) between the image display area and the non-image display area is clearly observed, causing the dynamic presence to be impaired. Therefore, in the present invention, the boundary (frame) between the image display area and the non-image display area is made unsharp so as not to be clearly observed, thereby enabling the dynamic presence to be improved.

If the image is made gradually darker from a predetermined position of the image display device as the distance therefrom increases toward the peripheral region of the image display device, the difference in contrast between the image display area and the non-image display area decreases. Therefore, the boundary (frame) between the image display area and the non-image display area becomes unsharp, and thus the dynamic presence improves.

If the resolution at the periphery of the image display device is deteriorated, the image of the boundary (frame) between the image display area and the non-image display area is not clearly, but instead unsharply formed. Therefore, the boundary (frame) is not clearly recognized, and thus the dynamic presence improves.

Further, whatever ocular optical system is used, if the principal ray in a ray bundle emanating from the most peripheral region of the image display device is not projected into the observer's eyeball, no image of the most peripheral region of the image display device is formed. Accordingly, the most peripheral region of the image display device looks blurred and dark. Consequently, the boundary between the image display area and the non-image display area becomes unsharp, and thus the dynamic presence improves.

In this case, it is preferable to dispose a device for cutting off the principal ray at a position away from the image display device by a distance which is not shorter than the depth of focus because, by doing so, the principal ray cut-off device looks favorably blurred.

It is also preferable to reduce the effective aperture of a part of the ocular optical system so that the principal ray in a ray bundle emanating from the most peripheral region of the image display device is prevented from being projected into the observer's eyeball. This arrangement makes it unnecessary to provide an extra optical element for vignetting.

The arrangement may also be such that the bundle of rays emanating from the periphery of the image display device is vignetted by a light-blocking member which is disposed in the ocular optical system or between the image display device and the ocular optical system, thereby darkening the image of the periphery of the image display device. In this case, since the light-blocking member can be changed, the dynamic presence can be changed according to the observer's liking using the same ocular optical system.

If the image position of the light-blocking member is close to the observer's eyeball, the observer feels physiologically uncomfortable. However, the occurrence of such a problem can be prevented by providing the light-blocking member so that the image thereof is formed at a position which is 25 millimeters or more away from the observer's eyeball.

Further, it is preferable to satisfy the following condition:

$$|A-B| > 3 \ m^{-1}$$

where A ($m^{-1}$) is the position where the image of the image display device is formed by the ocular optical system, and B ($m^{-1}$) is the position where the image of a light-blocking device is formed by the ocular optical system, which device blocks at least the principal ray in the ray bundle from the most peripheral region of the image display device.

If $|A-B| < 3 \ m^{-1}$, the light-blocking effect of the light-blocking device is reduced.

If a device for cutting off all of the ray bundle emanating from the most peripheral region of the image display device is provided at a position away from the image display device by a distance which is not shorter than the depth of focus so that the ray bundle from the most peripheral region of the image display device is prevented from being projected into the observer's eyeball, no image of the most peripheral region of the image display device will be formed. Thus, since there is no boundary between the image display area and the non-image display area, the dynamic presence is further improved.

Further, the device for blocking all of the ray bundle emanating from the most peripheral region of the image display device is preferably disposed at a position which is $f^2/333$ (millimeters) or more away from the image display device, where f (millimeters) is the focal length of the ocular optical system. If the distance is shorter than $f^2/333$ (millimeters), the light-blocking effect of the light-blocking device is reduced.

If the system is arranged such that the illuminance of light illuminating the image display device gradually decreases from a predetermined position as the distance therefrom increases toward the periphery of the image display device, the periphery of the image display device is darkened, resulting in a reduction of the contrast difference between the image display area and the non-image display area. Accordingly, the boundary between the image display area and the non-image display area becomes unsharp, and thus the dynamic presence is improved. Further, since the illuminance distribution of the illuminating light can be changed, the dynamic presence can be changed according to the observer's liking using the same ocular optical system.

If a light-blocking member which is arranged to limit illuminating light applied to the periphery of the image display device is disposed between the image display device and an illumination system therefor, the boundary between the image display area and the non-image display area becomes unsharp even if an ordinary illumination system that effects uniform illumination is used, and thus the dynamic presence is improved.

Further, if the image display device illuminating system is disposed away from the image display device, illumination unevenness occurs on the display surface of the image display device, causing the periphery of the image display device to be darkened. Accordingly, the boundary between the image display area and the non-image display area becomes unsharp, and thus the dynamic presence is improved.

If the transmittance at the periphery of the effective aperture region of the ocular optical system is made lower than the transmittance at the center of the effective aperture region, the periphery of the image display device becomes relatively dark. Accordingly, the boundary between the image display area and the non-image display area becomes unsharp, and thus the dynamic presence is improved. In this case, there is no need of adding an extra optical element.

In a case where the transmittance of the ocular optical system including a mirror is to be controlled, it is a simple and easy method to control the reflectivity at the periphery of the effective aperture region of the mirror.

Incidentally, liquid crystal display devices (LCD) have the nature that, owing to the characteristics of liquid crystal, the transmittance in a direction perpendicular to the LCD surface is the highest, and as the angle to the perpendicular line increases, the transmittance deteriorates; when the angle to the perpendicular line is about 15°, the transmittance becomes close to 0. Accordingly, if the system is arranged such that the angle between the principal ray in the ocular optical system and the image display device gradually increases from a predetermined position as the distance therefrom increases toward the periphery of the image display device, the image of the periphery of the image display device can be darkened. Consequently, the boundary between the image display area and the non-image display area becomes unsharp, and thus the dynamic presence is improved.

In the case of an image display device other than an LCD, the luminance (transmittance) of the image display device depends on the angle to the display surface. Therefore, the brightness of the image can be controlled by controlling the exit pupil position and pupil aberration in the optical system to thereby change the angle of the principal ray.

In this case, when the angle between the principal ray in the ocular optical system and the image display device is 15° or more at the most peripheral region of the image display device, the image of the periphery of the image display device is sufficiently dark, and the dynamic presence can be improved to a substantial extent.

If the system is arranged such that the resolution gradually deteriorates from a predetermined position of the image display device as the distance therefrom increases toward the most peripheral region, the image of the boundary (frame) between the image display area and the non-image display area is not clearly, but instead unsharply formed. Accordingly, the boundary (frame) is not clearly recognized, and thus the dynamic presence is improved.

The arrangement may also be such that at least either one of comatic and astigmatic aberrations in the ocular optical system increases from a predetermined position as the distance therefrom increases toward the periphery of the image display device, thereby deteriorating the image forming performance of the ocular optical system for forming the image of the periphery of the image display device. With this arrangement, the resolution at the periphery of the image display device is deteriorated. Therefore, the boundary (frame) between the image display area and the non-image display area becomes unsharp, and thus the dynamic presence is improved. Further, since it is not necessary to make aberration correction effectively as far as the periphery of the image display device, the load imposed on the ocular optical system for aberration correction is favorably reduced.

If a diffusing plate whereby the diffusing effect gradually increases from a predetermined position as the distance therefrom increases toward the periphery of the image display device is used, the resolution at the periphery of the image display device is deteriorated. Accordingly, the boundary (frame) between the image display area and the non-image display area becomes unsharp, and thus the dynamic presence is improved. In this case, the dynamic presence can be changed by loading or unloading the diffusing plate or changing it for another.

In the ocular optical system including a half-mirror and a concave mirror, light rays are preferably arranged to travel along either of the following two paths: ① the image display device→the half-mirror transmitting surface→the concave mirror reflecting surface→the half-mirror reflecting surface→the eyeball; and ② the image display device→the half-mirror reflecting surface→the concave mirror reflecting surface→the half-mirror transmitting surface→the eyeball. With either arrangement, the ocular optical system becomes compact, and occurrence of chromatic aberration can be prevented.

FIG. 1 shows an optical system in which the effective apertures of a half-mirror 3, a concave mirror 2, and a beam splitter prism 5 are reduced as a device for cutting off at least the principal ray in the ray bundle emanating from the most peripheral region of an image display device 1, which is disposed at a position away from the image display device 1 by a distance which is not shorter than the depth of focus. In the figure, reference numeral 1 denotes an image display device, and 4 the pupil position of an observer's eyeball. In this optical system, the pupil diameter is 4 millimeters. The optical system shown in FIG. 1 is designed so that the eye relief is 20 millimeters. FIG. 2 shows the same optical system in which the eye relief is set at 15 millimeters. FIG. 3 shows the same optical system in which the eye relief is set at 10 millimeters.

In the optical system shown in FIG. 2, the principal ray in the ray bundle from the most peripheral region of the image display device 1 is projected, although the ray bundle is vignetted. In the optical system shown in FIG. 3, there is no vignetting in the ray bundle from the most peripheral region of the image display device 1. Thus, even if the optical system is designed so that the image of the periphery of the image display device is made unsharp, an observer who likes observing an image in such use conditions as those shown in FIG. 2 or 3 tries to bring the eye 4 as close to the ocular optical system as possible. However, there is a limit beyond which the eye 4 cannot be brought closer to the ocular optical system because the observer's face or glasses would come in contact with the ocular optical system. For this reason, the observer feels an increasing irritation.

In order to avoid such a problem, the system should be arranged so that no particular effect will be produced by bringing the eye closer to the ocular optical system. For this purpose, the system should be arranged such that the image of the central region of the image display device is projected with favorable image forming performance without vignetting, and that vignetting and aberration increase in a region outside the central region as the distance therefrom increases toward the periphery of the image display device. It is particularly preferable to arrange the system such that the astigmatic difference increases, although the average image surface is the same as the average image surface in the good image formation field. By doing so, even if the observer brings his or her eye closer to the ocular optical system, only the brightness of the image of the periphery, which is blurred by aberration, increases. Therefore, there is no point in bringing the eye closer to the ocular optical system. Thus, it is possible to suppress the impulse to bring the eye closer to the apparatus. Consequently, it is possible to prevent the observer from bringing his or her eye closer to the ocular optical system, which would otherwise cause the observer's face or glasses to come in contact with the ocular optical system.

The good image formation region, which is free from vignetting, also needs to correct distortion effectively. In the region outside of the good image formation region, however, it is unnecessary to correct distortion so strictly as in the good image formation region. In this case, if plus distortion is intentionally produced, it becomes easy to ensure a wide field of view, and the dynamic presence is further enhanced.

If the amount of distortion is 10% or more at the diagonal position of the image display device, a wider field of view can be ensured even more effectively.

If the region in which vignetting is introduced is excessively wide, the displayed image becomes unfavorably dark. If the region in which image formation is effected with favorable performance without vignetting is 50% or more of the field of view, the dynamic presence can be favorably improved without making the displayed image very dark.

There are various methods of generating vignetting. In the case of an ocular optical system using a prism, however, the size of the prism may be determined according to the ray bundle emanating from the display region in which favorable image formation is effected, and vignetting may be generated by the prism or a concave mirror. By doing so, the size of the optical system is reduced, and there is no need for an extra optical element for vignetting. Accordingly, the optical system is simplified.

In this case, if the region in which image formation is effected with favorable performance without vignetting is from 50% to 90% of the field of view, vignetting can be favorably generated by using only the prism or the concave mirror.

In a case where the ray bundle from the periphery of the image display device is vignetted by reducing the effective aperture of the concave mirror, the concave mirror should be set at a position which is sufficiently far from both the image display device and the observer's eyeball. By doing so, no image of the concave mirror, which serves as a light-blocking member, is formed on the retina, and there is no possibility of the concave mirror coming close to the eyeball, causing the observer to feel physiologically uncomfortable.

If a prism having a half-mirror is used in the ocular optical system, it becomes easy to ensure the distance between the image display device and the observer's eyeball, and the focal length can be readily shortened. As a result, it becomes easy to widen the field of view.

If the prism is made of a plastic material, the overall weight of the apparatus can be reduced, which is favorable for a head- or face-mounted image display apparatus.

If either the end surface of the prism which faces the image display device or a lens which is disposed between the image display device and the prism has an aspherical surface, it is possible to effectively control distortion and the inclination of the principal ray. If the aspherical surface is designed so that negative power added increases as the distance from the optical axis increases toward the periphery as far as a predetermined position in the effective aperture region, it is possible to correct minus distortion which is produced by the concave mirror.

If either the end surface of the prism which faces the image display device or a lens which is disposed between the image display device and the prism is designed so that the power in the peripheral portion of the effective aperture region is shifted in the positive direction in comparison to the power at the periphery of the optical axis, it is easy to make the image of the periphery of the image display device unsharp, generate a minus distortion and ensure a wider field of view.

Further, if the eye relief of the ocular optical system is 20 millimeters or more, the observer can view the image with his or her glasses on. Therefore, it is even more preferable to set the eye relief at 20 millimeters or more.

Further, if the ocular optical system is arranged such that an outside-world image is displayed superimposed on the periphery of the image of the image display device, the difference in brightness between the image display area and the non-image display area reduces. Therefore, the boundary (frame) between the image display area and the non-image display area becomes unsharp, and thus the dynamic presence is improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 13(a) and 13(b) are views for explaining a method of illuminating an LCD used in Example 10 of the present invention.

FIG. 14 is a sectional view of an optical system in Example 11 of the present invention.

DESCRIPTION OF THE PREFERRED EMBODIMENTS

Examples 1 to 14 of the optical system of the head-mounted image display apparatus according to the present invention will be described below with reference to the accompanying drawings. It should be noted that numerical data in Examples 1 to 8 will be shown later.

EXAMPLE 1

Figure 1:
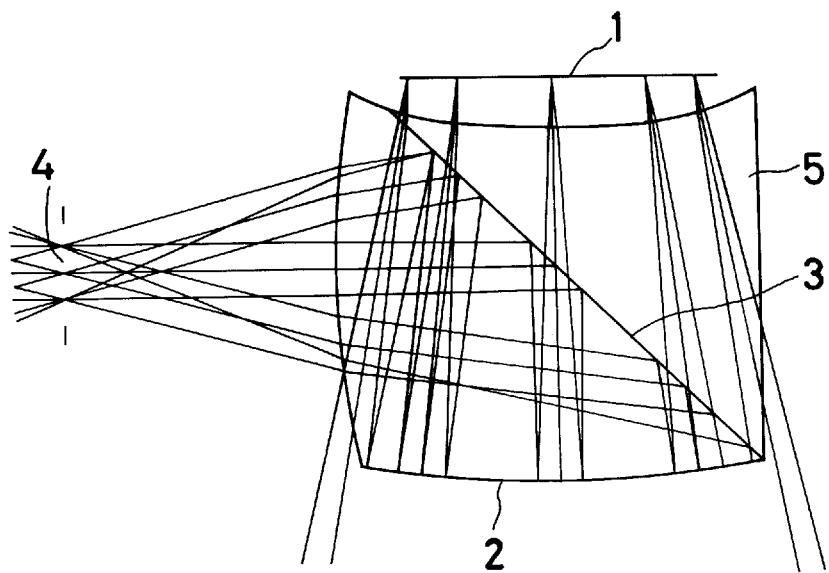
FIG. 1 is a sectional view showing one optical system of a head-mounted image display apparatus which employs a device for cutting off the principal ray emanating from the most peripheral region of an image display device.
Figure 2:
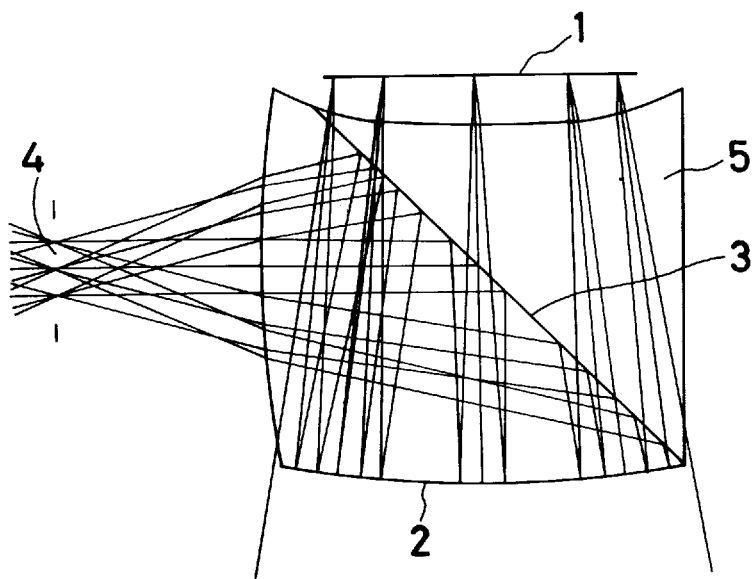
FIG. 2 is a sectional view of the optical system shown in FIG. 1 in which the eye relief is reduced.
Figure 3:
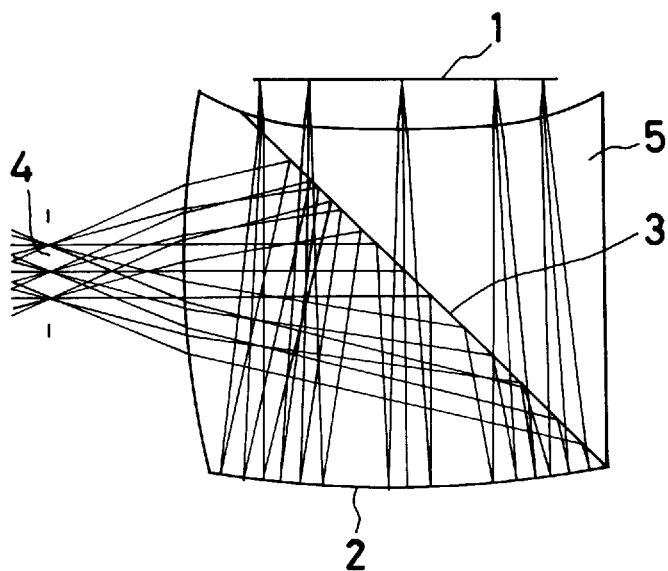
FIG. 3 is a sectional view of the optical system shown in FIG. 1 in which the eye relief is further reduced.
Figure 4:
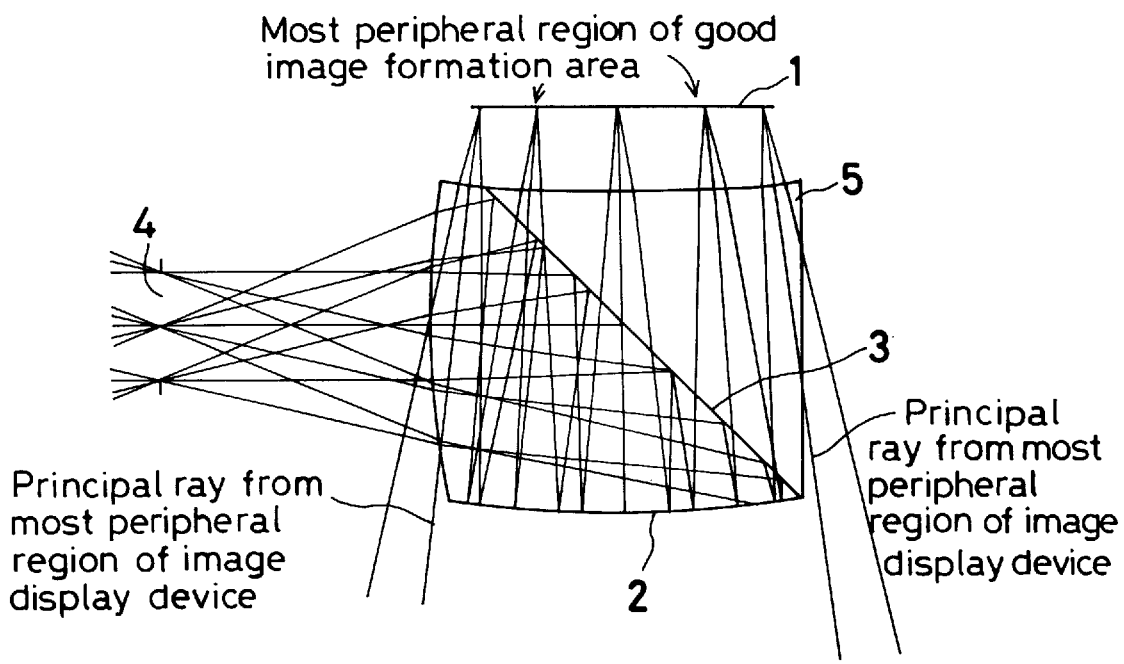
FIG. 4 is a sectional view of an optical system in Example 1 of the present invention.

FIG. 4 shows the optical system of this example. In this example, the effective aperture of a part of the ocular optical system is reduced. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
Good image formation field:
  Horizontal field angle 35°
  Vertical field angle 26.6°
Field of view:
  Horizontal field angle 58°
  Vertical field angle 45.2°
(the good image formation field is about 60% of the field of view)

If the size of the prism 5 is set as shown in FIG. 4 (i.e., 29 millimeters×24 millimeters×27 millimeters), the principal ray in the ray bundle emanating from the most peripheral region of the LCD 1 is not projected into the eyeball 4. Therefore, it is possible to obtain an image improved in its sence of immersion.

In this case, the good image formation field is equivalent to the field of view which is obtained when a 0.8-inch LCD is observed without vignetting. As a method of making the image of the periphery of the image display device unsharp, the effective apertures of the half-mirror 3, the concave mirror 2 and the beam splitter prism 5 are reduced, thereby enabling the field of view to become enlarged by 1.7 times without increasing the size of the prism 5.

The aspherical surface that is provided on the LCD-side end surface of the prism 5 corrects distortion in the good image formation field within ±5%, but, on the other hand, it produces a large minus distortion outside the good image formation field, thereby enabling a wide field of view to be readily ensured (although a minus distortion is observed in backward ray tracing, it is a plus distortion in forward ray tracing).

Further, the prism 5 is made of a plastic material to achieve a reduction in the overall weight of the apparatus.

Although the optical system in this example uses a prism, the present invention is not necessarily limited thereto.

EXAMPLE 2

Figure 5:
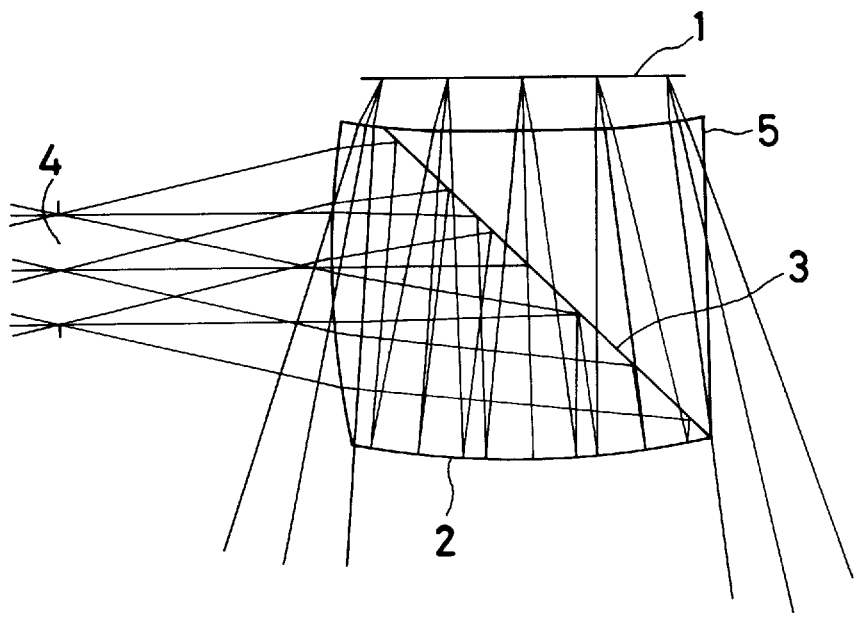
FIG. 5 is a sectional view of an optical system in Example 2 of the present invention.

FIG. 5 shows the optical system of this example. In this example also, the effective aperture of a part of the ocular optical system is reduced in the same way as in Example 1. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
Good image formation field:
  Horizontal field angle 35°
  Vertical field angle 26.6°
Field of view:
  Horizontal field angle 66°
  Vertical field angle 52.0°
(the good image formation field is about 52% of the field of view)

If the size of the prism 5 is set as shown in FIG. 5, the ray bundle emanating from the periphery of the LCD 1 is not projected into the eyeball 4. In this case, the size of the prism 5 can be reduced to about 29 millimeters×24 millimeters×27 millimeters.

EXAMPLE 3

Figure 6:
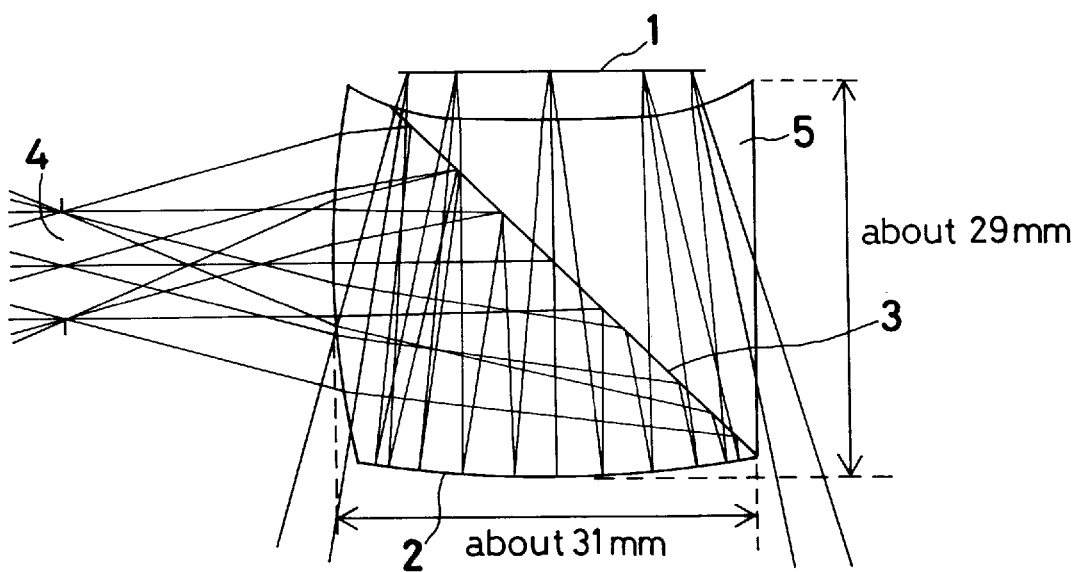
FIG. 6 is a sectional view of an optical system in Example 3 of the present invention.

FIG. 6 shows the optical system of this example. In this example also, the effective aperture of a part of the ocular optical system is reduced in the same way as in Example 1. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
Good image formation field:
  Horizontal field angle 40°
  Vertical field angle 30.6°
Field of view:
  Horizontal field angle 60°

Vertical field angle 46.8°
(the good image formation field is about 66% of the field of view)

If the size of the prism 5 is set as shown in FIG. 6, the ray bundle emanating from the periphery of the LCD 1 is not projected into the eyeball 4. In this case, the size of the prism 5 can be reduced to about 34 millimeters×29 millimeters×31 millimeters.

EXAMPLE 4

Figure 7:
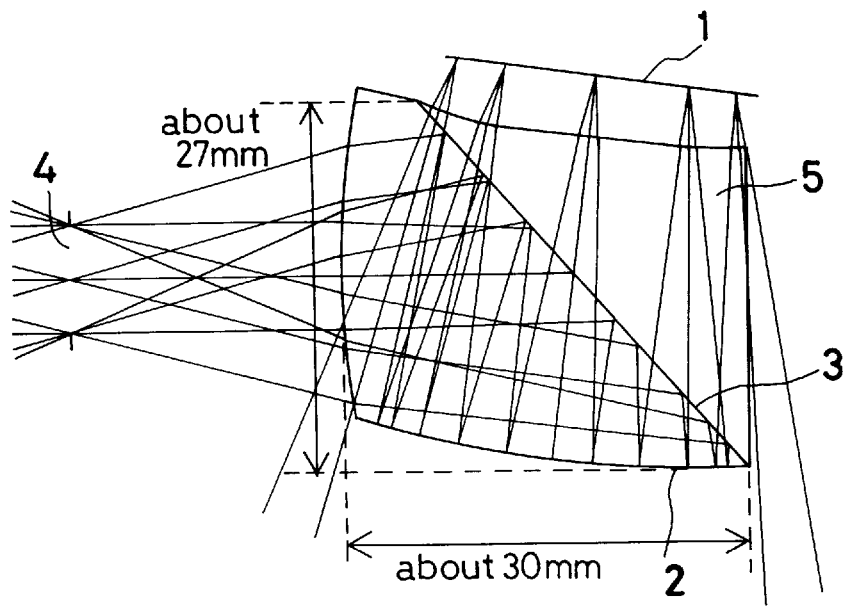
FIG. 7 is a sectional view of an optical system in Example 4 of the present invention.

FIG. 7 shows the optical system of this example. In this example also, the effective aperture of a part of the ocular optical system is reduced in the same way as in Example 1. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
  Good image formation field:
    Horizontal field angle 40°
    Vertical field angle 30.6°
  Field of view:
    Horizontal field angle 60°
    Vertical field angle 46.8°
(the good image formation field is about 66% of the field of view)

The specifications of this example are the same as those of Example 3. In this example, however, the optical axis of the optical system is decentered, and it is therefore possible to reduce the distance between the eyeball 4 and the LCD 1. Consequently, it becomes easy to ensure the distance between the LCD 1 and the prism 5, and the size of the prism 5 can be further reduced. If the size of the prism 5 is set as shown in FIG. 7, the principal ray in the ray bundle emanating from the most peripheral region of the LCD 1 is not projected into the eyeball 4. In this case, the size of the prism 5 can be reduced to about 34 millimeters×27 millimeters×30 millimeters.

EXAMPLE 5

Figure 8:
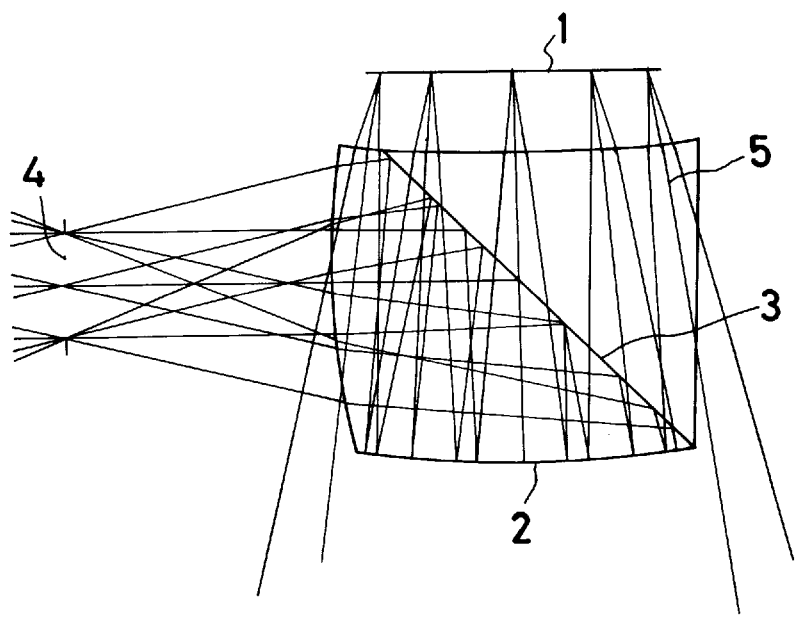
FIG. 8 is a sectional view of an optical system in Example 5 of the present invention.

FIG. 8 shows the optical system of this example. In this example also, the effective aperture of a part of the ocular optical system is reduced in the same way as in Example 1. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
  Good image formation field:
    Horizontal field angle 35°
    Vertical field angle 27°
  Field of view:
    Horizontal field angle 58°
    Vertical field angle 45°
(the good image formation field is about 78% of the field of view)

In this example, an aspherical concave mirror 2 which is designed so that the curvature gradually decreases (i.e., the power gradually increases) as the distance from the optical axis increases toward the periphery thereof is used, thereby correcting the distortion in the good image formation field to minus 5% or less, and at the same time, producing a large minus distortion outside the good image formation field, and thus making it possible to ensure a wide field of view (although a minus distortion is observed in backward ray tracing, it is a plus distortion in forward ray tracing).

EXAMPLE 6

Figure 9:
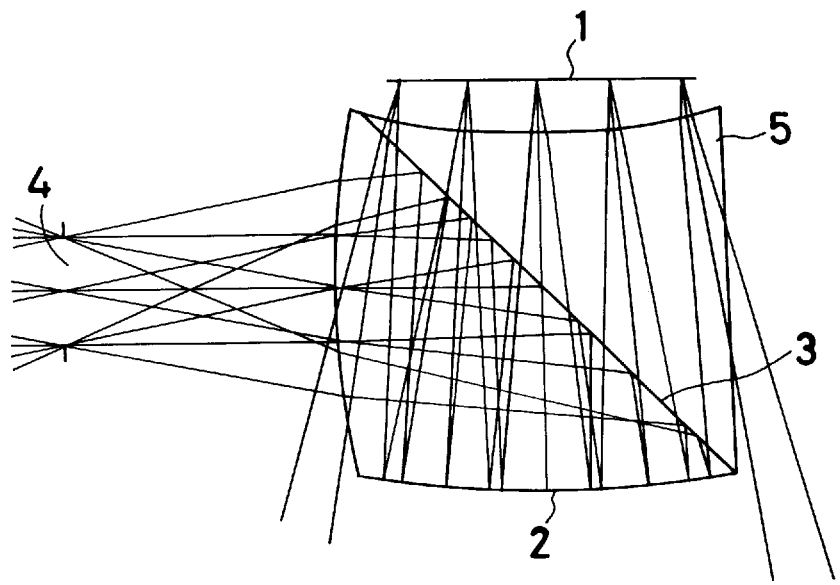
FIG. 9 is a sectional view of an optical system in Example 6 of the present invention.

FIG. 9 shows the optical system of this example. In this example also, the effective aperture of a part of the ocular optical system is reduced in the same way as in Example 1. The optical system of this example includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4.

Specifications of this optical system, using a 1.3-inch LCD, are as follows:
  Good image formation field:
    Horizontal field angle 30°
    Vertical field angle 23°
  Field of view:
    Horizontal field angle 60°
    Vertical field angle 47°
(the good image formation field is about 50% of the field of view)

In this example, the LCD-side end surface of the prism 5 is formed into an aspherical surface in which negative power increases as the distance from the optical axis increases toward the outer periphery, and the power changes to a positive power as the distance from a certain position increases toward the outer periphery.

Employment of such an aspherical surface makes it possible to obtain the following advantageous effects:

(1) Within the good image formation field, the minus distortion that is produced by the concave mirror 2 is corrected, thereby correcting the distortion in the ocular optical system to minus 5% or less. Outside the good image formation field, a large minus distortion is produced, thereby making it possible to ensure a wide field of view (although a minus distortion is observed in backward ray tracing, it is a plus distortion in forward ray tracing).

(2) The angle between the principal ray from the periphery of the LCD 1 and the LCD 1 is increased to thereby darken the image of the periphery of the LCD 1 (i.e., the inclination of the principal ray in the ocular optical system is controlled). The inclination of the principal ray at each of the long and short sides and diagonal ends of the LCD 1 is as follows:

Inclination of the principal ray at the LCD long side: 14°
Inclination of the principal ray at the LCD short side: 7°
Inclination of the principal ray at the LCD diagonal: 35°

(3) Astigmatism and coma (negative comatic aberration) are intentionally produced to deteriorate the resolution of the image of the periphery of the image display device, thereby making the boundary between the image display area and the non-image display area unsharp (i.e., the image forming performance of the ocular optical system with respect to the periphery of the image display device is intentionally deteriorated). In the prism optical system, negative comatic aberration and such astigmatism that the X-image surface is on the plus side, while the Y-image surface is on the minus side are likely to occur. Therefore, it is even more preferable to produce the above-described aberrations.

EXAMPLE 7

Figure 10:
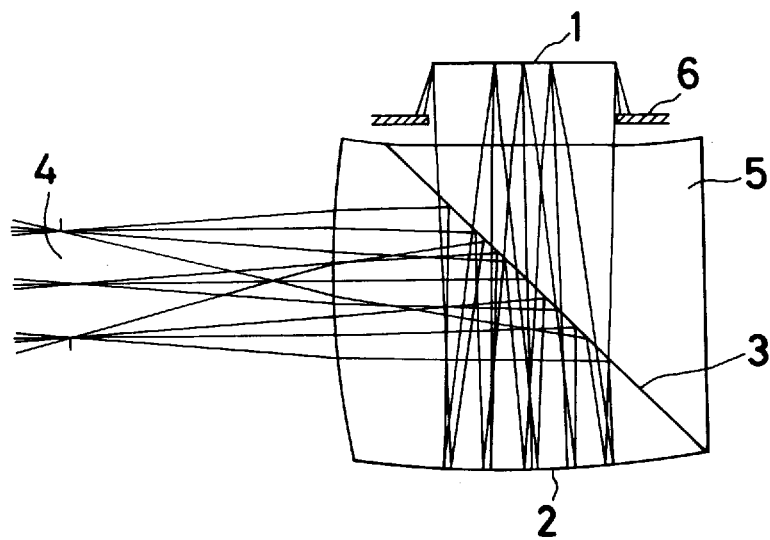
FIG. 10 is a sectional view of an optical system in Example 7 of the present invention.

FIG. 10 shows the optical system of this example. In this example, the image of the periphery of the image display device is made unsharp by using a light-blocking member. The ocular optical system of this example is arranged in the same way as in Example 1. That is, it includes an LCD 1 for displaying an image, and a beam splitter prism 5 having a half-mirror 3 which is disposed at a tilt at an intersection between the optical axis of the LCD 1 and the observer's visual axis to lead an image ray bundle emanating from the LCD 1 to a pupil 4 of an observer's eyeball. The optical system further includes a concave mirror 2 which is provided on a surface of the beam splitter prism 5 on the side thereof which is remote from the LCD 1. Thus, after entering the prism 5, the image that is displayed on the LCD 1 is successively reflected by the concave mirror 2 and the half-mirror 3 and then enters the eyeball 4. In addition, a light-blocking frame 6 is disposed between the LCD 1 and the beam splitter prism 5.

Specifications of this optical system, using a 1.3-inch LCD, are as follows:

Good image formation field:
   Horizontal field angle 12°
   Vertical field angle 9°
Field of view:
   Horizontal field angle 38°
   Vertical field angle 29°

(the good image formation field is about 32% of the field of view)

In this example, the light-blocking frame 6, which has a shape similar to that of the LCD 1, is used to prevent the principal ray in the ray bundle from the most peripheral region of the LCD 1 from reaching the eyeball 4.

If the light-blocking frame 6 is disposed at the position of the LCD 1, the frame 6 functions as a field stop, and the shape of the frame 6 is undesirably projected into the eyeball 4. Therefore, the light-blocking frame 6 must be disposed at a position away from the LCD 1 by a distance not shorter than the depth of focus. If the frame 6 is disposed at a position away from the LCD 1 by at least a distance 20 times as long as the depth of focus, the blurring effect is enhanced even more favorably. If the size of the light-blocking frame 6 is further reduced, the ray bundle emanating from the most peripheral region of the LCD 1 can be completely cut off.

If the light-blocking frame 6 is disposed at a position which is 2 millimeters away from the LCD 1, the image of the light-blocking frame 6 that is formed by the ocular optical system lies at a position which is −260 millimeters away from the pupil 4 of the observer's eyeball. If the light-blocking frame 6 is disposed at a position which is 4 millimeters away from the LCD 1, the image of the frame 6 lies at a position which is −155 millimeters away from the pupil 4.

EXAMPLE 8

Figure 11:
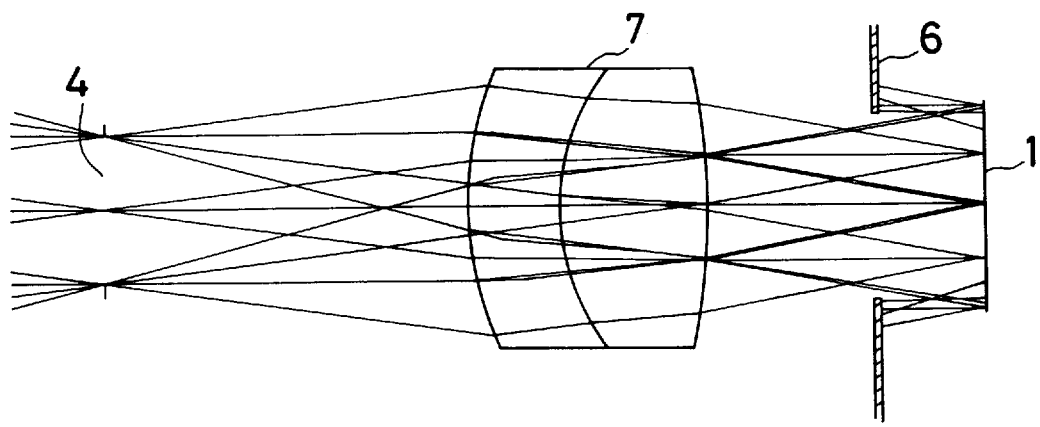
FIG. 11 is a sectional view of an optical system in Example 8 of the present invention.

FIG. 11 shows the optical system of this example. In this example also, the image of the periphery of the image display device is made unsharp by using a light-blocking member. However, the ocular optical system of this example is formed by using only a doublet 7 which is composed of two lenses cemented together, that is, a biconvex lens which is disposed at the side which is closer to an LCD 1 for displaying an image, and a negative meniscus lens which is disposed at the side which is closer to a pupil 4 of an observer's eyeball. In addition, a light-blocking frame 6 is disposed between the LCD 1 and the doublet 7.

Specifications of this optical system, using a 0.7-inch LCD, are as follows:

Good image formation field:
   Horizontal field angle 20°
   Vertical field angle 15°
Field of view:
   Horizontal field angle 38°
   Vertical field angle 29°

(the good image formation field is about 52% of the field of view)

In this example also, the light-blocking frame 6, which has a shape similar to that of the LCD 1, is used to prevent the principal ray in the ray bundle from the most peripheral region of the LCD 1 from reaching the eyeball 4.

If the light-blocking frame 6 is disposed at a position which is 5 millimeters away from the LCD 1, the image of the light-blocking frame 6 that is formed by the ocular optical system 7 lies at a position which is −88 millimeters away from the pupil 4 of the observer's eyeball. If the light-blocking frame 6 is disposed at a position which is 10 millimeters away from the LCD 1, the image of the frame 6 lies at a position which is −46 millimeters away from the pupil 4.

EXAMPLE 9

Figure 12:
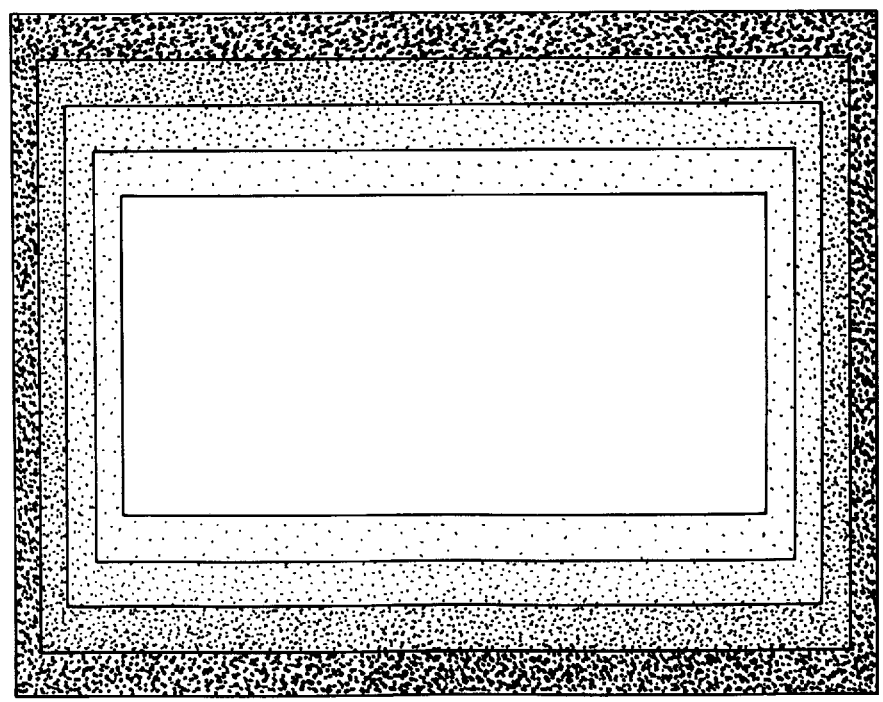
FIG. 12 is a plan view of a light-blocking member used in Example 9 of the present invention.

In this example, whatever ocular optical system is used, an illumination system for an LCD when used as an image display device is controlled so that the image of the periphery of the image display device is unsharp. As shown in FIG. 12, a light-blocking member 8 in which the transmittance gradually decreases as the distance from the center increases toward the periphery is disposed between the LCD and the illumination system for the LCD, thereby weakening the intensity of illumination light applied to the periphery of the image display device.

EXAMPLE 10

When an LCD is used as an image display device, as shown in FIG. 13(*b*), a backlight 9 is usually disposed in close proximity to the LCD 1. In this example, however, as shown in FIG. 13(*a*), the backlight 9 is disposed away from the LCD 1, thereby generating illumination unevenness so that the image of the periphery of the LCD 1 becomes dark. In this way, the image of the periphery of the image display device is made unsharp.

EXAMPLE 11

In this example, the transmittance of the ocular optical system is controlled. As shown in FIG. 14, the optical system of this example includes an LCD 1 for displaying an image, a beam splitter prism 5 having a half-mirror 3 which is disposed at a tilt at an intersection between the optical axis of the LCD 1 and the observer's visual axis to lead an image ray bundle emanating from the LCD 1 to an pupil 4 of an observer's eyeball, and a concave mirror 2 which is provided on a surface of the beam splitter prism 5 on the side thereof which is remote from the LCD 1, in the same way as in Example 1 to 8. In this example, the diameter of the concave mirror 2, which is to be coated on the prism 5, is limited to the area A, and the area surrounding the area A is used as either a transmitting surface or an absorbing surface.

Specifications of this optical system, using a 1.3-inch LCD, are as follows:

Good image formation field:
  Horizontal field angle 12°
  Vertical field angle 9°
Field of view:
  Horizontal field angle 38°
  Vertical field angle 29°
(the good image formation field is about 32% of the field of view)

In this example, no mirror coating is provided on the area outside the concave mirror 2, on which the principal ray in the ray bundle from the most peripheral region of the LCD 1 strikes, thereby preventing the principal ray in the most peripheral ray bundle from reaching the observer's eye 4. If the mirror coating area is further reduced, it is possible to completely cut off the most peripheral ray bundle.

EXAMPLE 12

Figure 15:
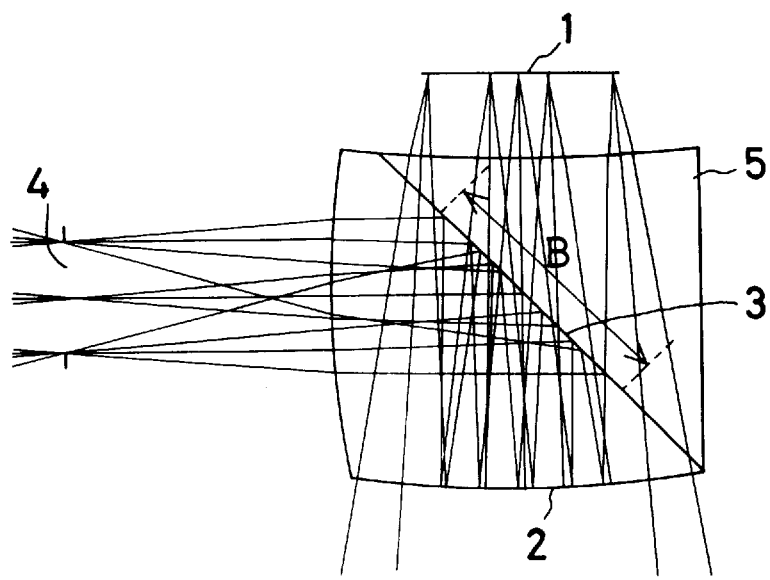
FIG. 15 is a sectional view of an optical system in Example 12 of the present invention.

In this example also, the transmittance of the ocular optical system is controlled. As shown in FIG. 15, the arrangement of the ocular optical system is the same as in Examples 1 to 8 and 11. In this example, however, the area of the half-mirror 3 which is provided in the prism 5 is limited to the area B, and the area surrounding the area B is used as a transmitting surface.

Specifications of this optical system, using a 1.3-inch LCD, are as follows:

Good image formation field:
  Horizontal field angle 12°
  Vertical field angle 9°
Field of view:
  Horizontal field angle 38°
  Vertical field angle 29°
(the good image formation field is about 32% of the field of view)

In this example, the area of the half-mirror 3 is limited so that the principal ray in the ray bundle from the most peripheral region of the LCD 1 will not reach the observer's eyeball 4. If the area of the half-mirror 3 is further limited, it is possible to completely cut off the most peripheral ray bundle from the LCD 1.

EXAMPLE 13

Figure 16:
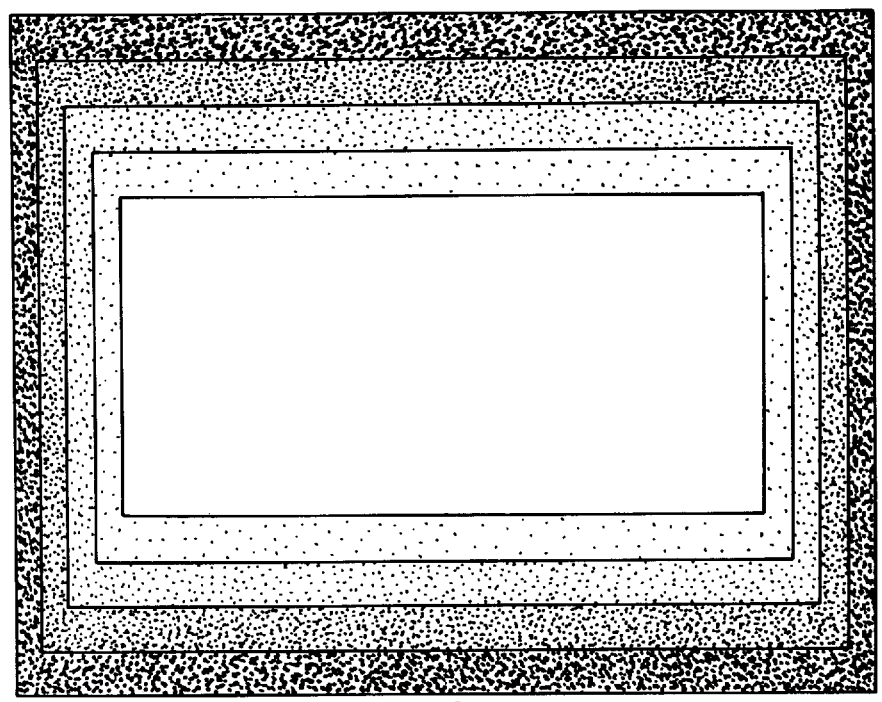
FIG. 16 is a plan view of a diffusing plate used in Example 13 of the present invention.

In this example, a diffusing plate is used. As shown in FIG. 16, a diffusing plate 10 in which the diffusing effect gradually increases as the distance from the center increases toward the periphery is disposed in any known ocular optical system or between an image display device and the ocular optical system, thereby making the image of the periphery of the image display device unsharp.

EXAMPLE 14

Figure 17:
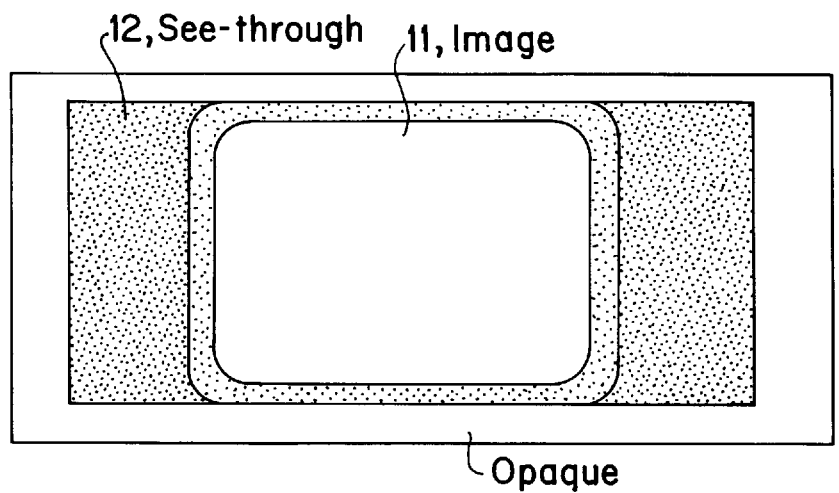
FIG. 17 shows a display image frame obtained in Example 14 of the present invention.
Figure 18:
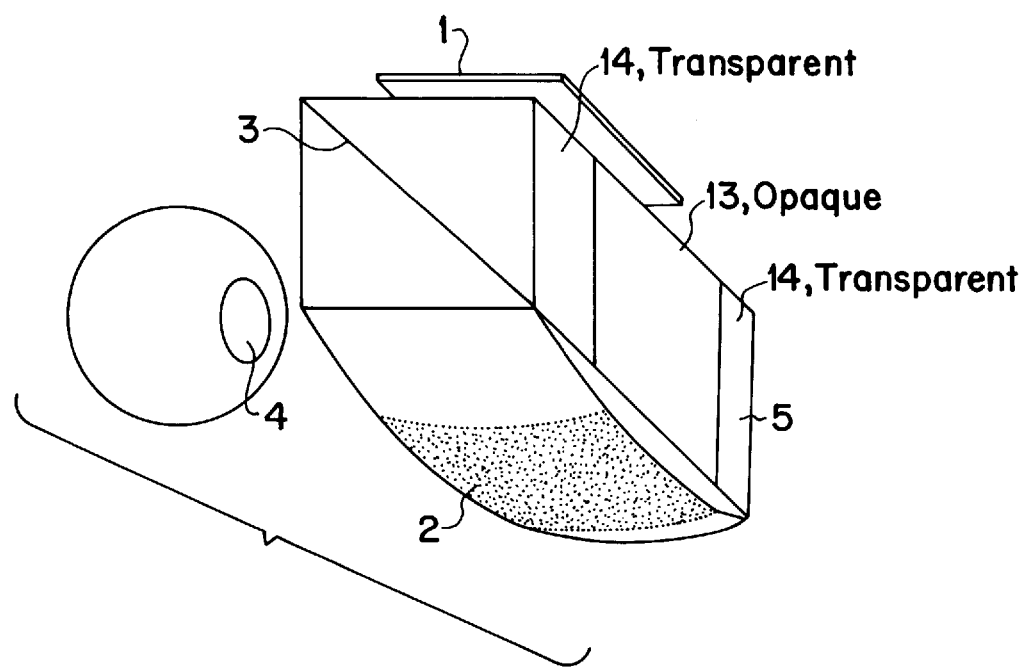
FIG. 18 shows one example of an arrangement for obtaining the display image frame shown in FIG. 17.

In this example, as shown in FIG. 17, an outside-world image 12 is displayed superimposed on the periphery of an image 11 of an image display device. For example, an arrangement for this purpose may be such as that shown in FIG. 18. In an ocular optical system arranged as in Examples 1 to 8 and 11, the central portion of the front surface of the beam splitter prism 5, which is remote from the observer's eyeball 4, is shielded from light as indicated by reference numeral 13, and the area surrounding the light-blocking portion 13 is left transparent as indicated by reference numeral 14.

By using a pair of optical systems such as those in the foregoing Examples 1 to 14, it becomes unnecessary for the observer to view the observation image with one eye closed. If observation can be effected with both eyes, the observer can view the displayed image without fatigue. Further, if images with a disparity therebetween are presented to the right and left eyes, it is possible to realize stereoscopic vision. Further, it becomes possible to view the observation image in an easy posture by using a pair of optical systems according to the present invention and attaching thereto a support mechanism for supporting the image display apparatus with respect to the observer's head.

Figure 19:
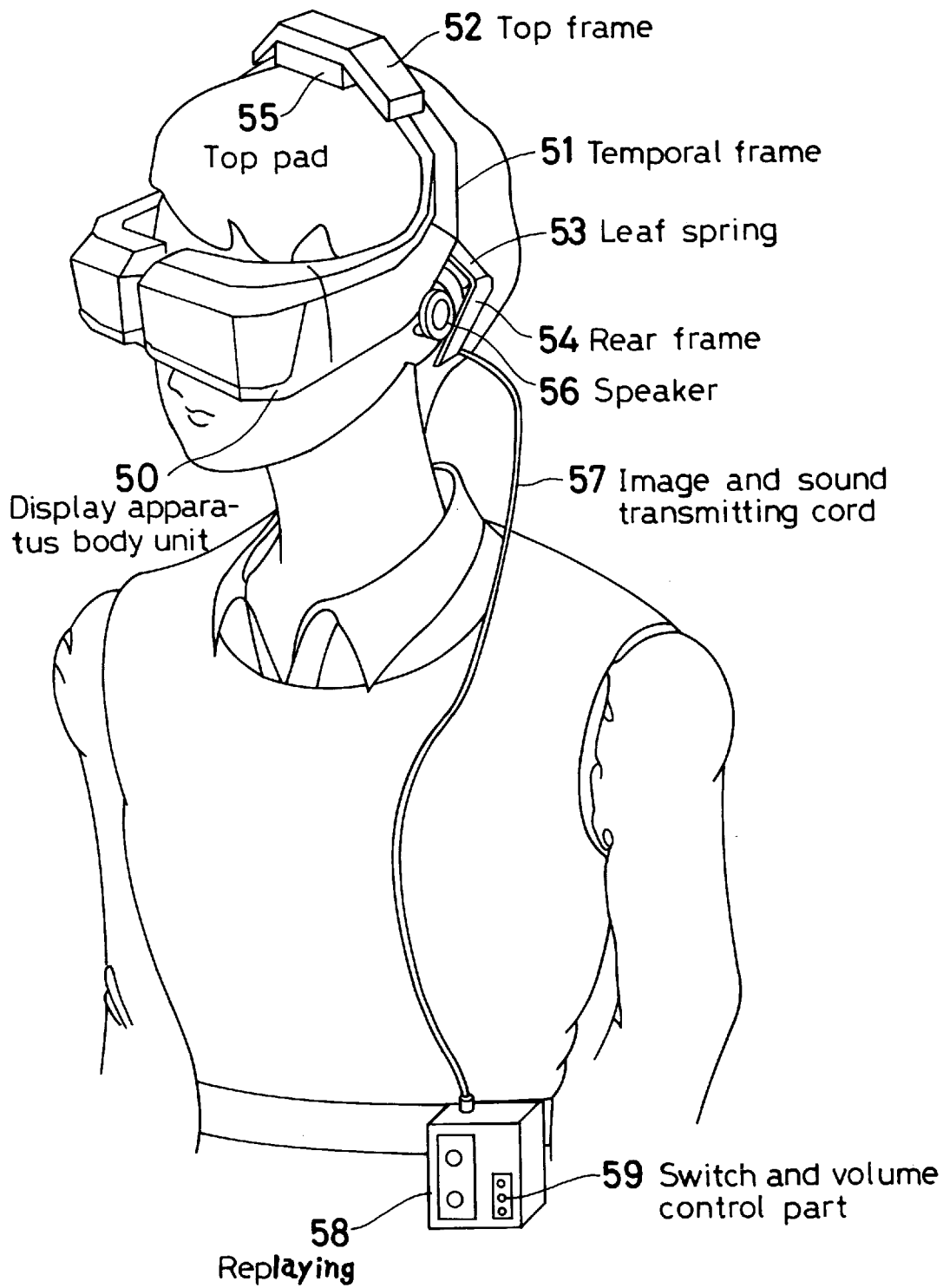
FIG. 19 shows the whole arrangement of one example of a portable image display apparatus according to the present invention.
Figure 20:
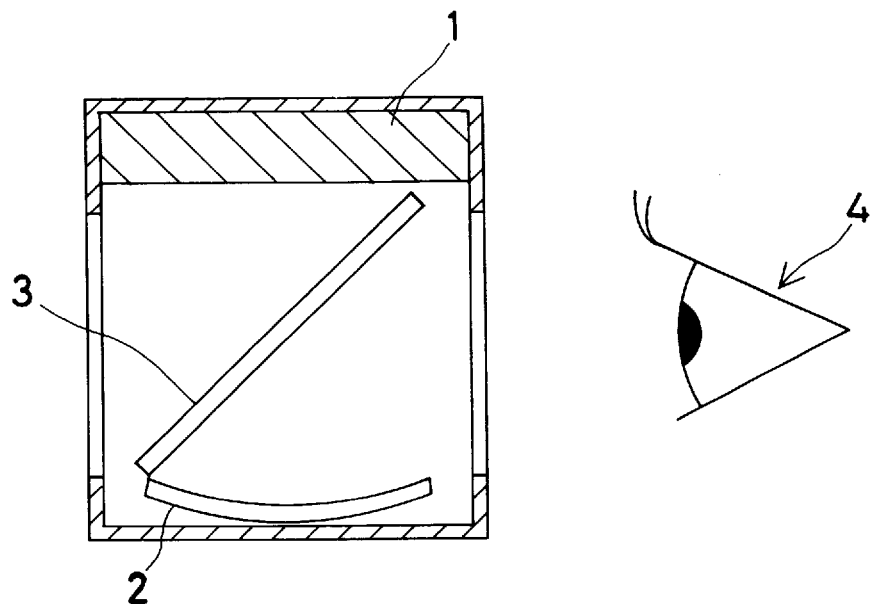
FIG. 20 shows the arrangement of one example of conventional head-mounted image display apparatus.
Figure 21:
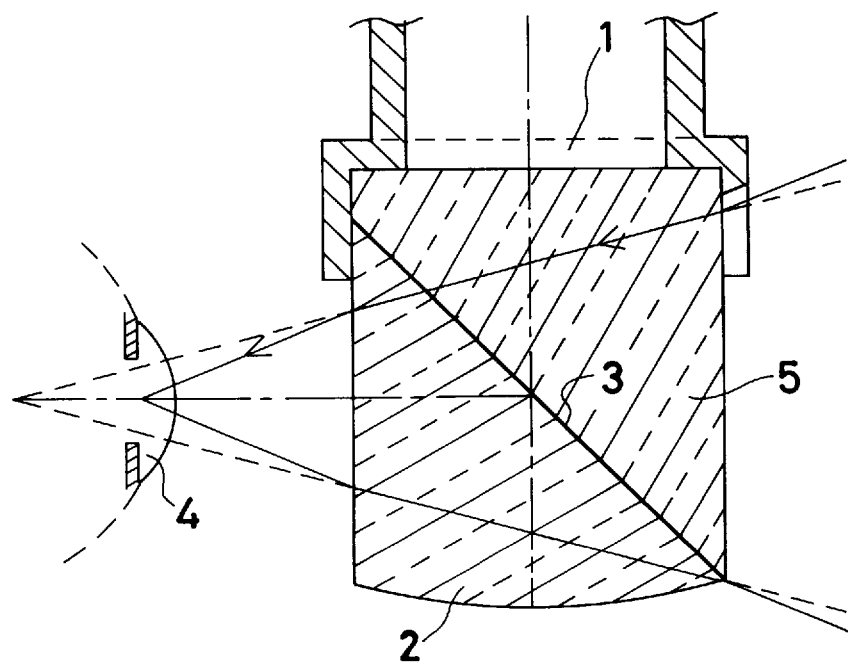
FIG. 21 shows the arrangement of another conventional head-mounted image display apparatus.
Figure 22:
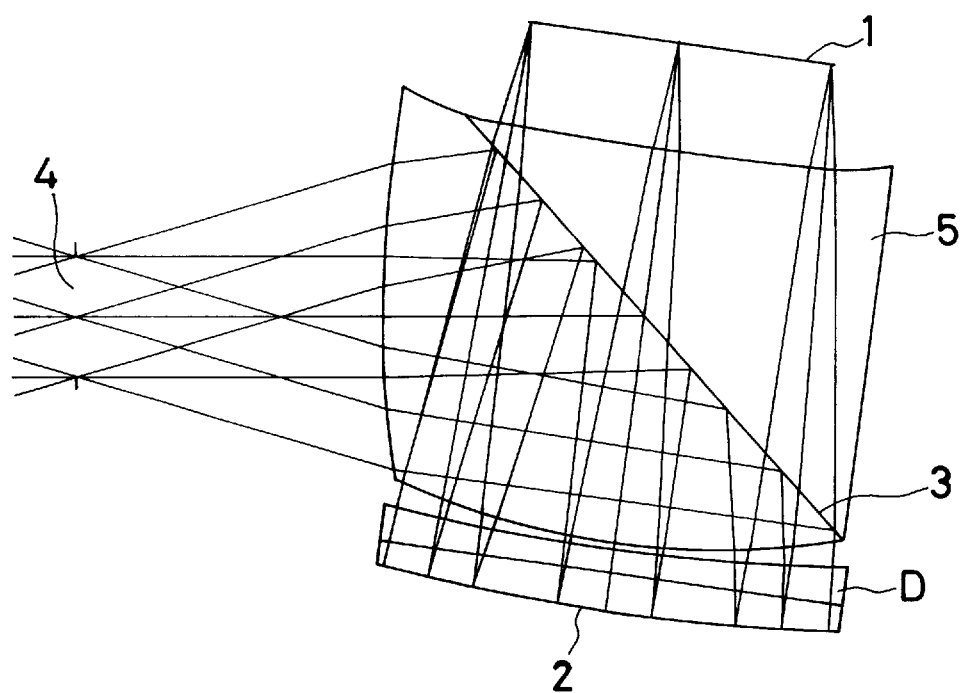
FIG. 22 shows the arrangement of a modification of the optical system shown in FIG. 21.

It is possible to form a portable image display apparatus, such as a stationary or head-mounted image display apparatus, which enables the observer to see with both eyes by preparing a pair of optical systems such as those in Examples 1 to 14 for the left and right eyes, and supporting them apart from each other by the distance between the eyes. FIG. 19 shows the whole arrangement of an example of such a portable image display apparatus. A display apparatus body unit 50 contains a pair of left and right optical systems such as those described above. The apparatus body unit 50 has a support member attached thereto so that the apparatus body unit 50 is retained on the observer's face with the support member fitted to the observer's head. The support member is arranged as follows. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a replaying unit 58, e.g., a portable video cassette unit, through an image and sound transmitting cord 57. Therefore, the user can enjoy not only observing an image but also listening to sound with the replaying unit 58 retained on a desired position, e.g., a belt, as illustrated in the figure. Reference numeral 59 in the figure denotes a switch and volume control part of the replaying unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

Numerical data in the above-described Examples 1 to 8, which are obtained by backward ray tracing, will be shown below. These pieces of data are all shown in the order of backward ray tracing from the pupil 4 to the image display device 1. In all Examples, $r_0$ denotes the object plane, $r_1$ is the pupil 4, $r_2, r_3 \ldots$ are the radii of curvature of lens surfaces or reflecting surfaces, $d_0, d_1, d_2 \ldots$ are the spacings between adjacent lens surfaces, $n_{d1}, n_{d2} \ldots$ are the refractive indices for the spectral d-line of the vitreous materials, $Y_{d1}, Y_{d2} \ldots$ are the Abbe's numbers of the vitreous materials, and $r_{10}$ is the image display device 1. $\Theta$ denotes the angle between the line normal to the LCD 1 and the line normal to the half-mirror 3 (i.e., the inclination of the half-mirror 3). Further, the aspherical configuration is expressed by $$z = ch^2/\{1+[1-c^2(K+1)h^2]^{1/2}\} + Ah^4 + Bh^6 + Ch^8 + Dh^{10} \quad (7)$$

where z: deviation from a plane tangent to a lens at the optical axis (sag value)

c: paraxial curvature h: distance from the optical axis

K: conical constant

A: 4th-order aspherical coefficient

B: 6th-order aspherical coefficient

C: 8th-order aspherical coefficient

D: 10th-order aspherical coefficient

Example 1

$r_0 = \infty$ (Object Plane)   $d_0 = -1000.000000$
$r_1 = \infty$ (4)   $d_1 = 20.000000$
$r_2 = 66.16270$   $d_2 = 14.000000$   $n_{d1} = 1.525400$   $v_{d1} = 56.3$
$r_3 = \infty$ (3)   $d_3 = -14.000000$   $n_{d2} = 1.525400$   $v_{d2} = 56.3$
($\theta = 45.000000°$)
$r_4 = 86.34040$ (2)   $d_4 = 24.000000$   $n_{d3} = 1.525400$   $v_{d3} = 56.3$
$r_5 = \infty$ (Aspheric)   $d_5 = 6.065328$
$r_{10} = \infty$ (1)
Aspherical Coefficients 5th surface K = -1.000000
A = 0.176495 × 10⁻⁴
B = C = D = 0
Example 2

$r_0 = \infty$ (Object Plane)   $d_0 = -1000.000000$
$r_1 = \infty$ (4)   $d_1 = 20.000000$
$r_2 = 69.68840$   $d_2 = 14.000000$   $n_{d1} = 1.525400$   $v_{d1} = 56.3$
$r_3 = \infty$ (3)   $d_3 = -14.000000$   $n_{d2} = 1.525400$   $v_{d2} = 56.3$
($\theta = 45.000000°$)
$r_4 = 73.87907$ (2)   $d_4 = 24.000000$   $n_{d3} = 1.525400$   $v_{d3} = 56.3$
$r_5 = \infty$ (Aspheric)   $d_5 = 3.797873$
$r_{10} = \infty$ (1)

-continued

Aspherical Coefficients

5th surface

K = -1.000000
A = 0.275606 × 10⁻⁴
B = C = D = 0
Example 3

$r_0 = \infty$ (Object Plane)   $d_0 = -1000.000000$
$r_1 = \infty$ (4)   $d_1 = 20.000000$
$r_2 = 72.89831$   $d_2 = 16.000000$   $n_{d1} = 1.525400$   $v_{d1} = 56.3$
$r_3 = \infty$ (3)   $d_3 = -16.000000$   $n_{d2} = 1.525400$   $v_{d2} = 56.3$
($\theta = 45.000000°$)
$r_4 = 79.01767$ (2)   $d_4 = 26.500000$   $n_{d3} = 1.525400$   $v_{d3} = 56.3$
$r_5 = \infty$ (Aspheric)   $d_5 = 3.526499$
$r_{10} = \infty$ (1)
Aspherical Coefficients 5th surface K = -1.000000
A = 0.552271 × 10⁻⁴
B = C = D = 0
Example 4

$r_0 = \infty$ (Object Plane)   $d_0 = -1000.000000$
$r_1 = \infty$ (4)   $d_1 = 20.000000$
$r_2 = 63.81664$   $d_2 = 17.000000$   $n_{d1} = 1.525400$   $v_{d1} = 56.3$
$r_3 = \infty$ (3)   $d_3 = -14.000000$   $n_{d2} = 1.525400$   $v_{d2} = 56.3$
($\theta = 41.000000°$)
$r_4 = 79.69406$ (2)   $d_4 = 24.000000$   $n_{d3} = 1.525400$   $v_{d3} = 56.3$
$r_5 = \infty$ (Aspheric)   $d_5 = 4.622182$
$r_{10} = \infty$ (1)
Aspherical Coefficients 5th surface K = -1.000000
A = 0.398580 × 10⁻⁴
B = C = D = 0
Example 5

$r_0 = \infty$ (Object Plane)   $d_0 = -1000.000000$
$r_1 = \infty$ (4)   $d_1 = 20.000000$
$r_2 = 67.22728$   $d_2 = 13.500000$   $n_{d1} = 1.525400$   $v_{d1} = 56.3$
$r_3 = \infty$ (3)   $d_3 = -13.500000$   $n_{d2} = 1.525400$   $v_{d2} = 56.3$
($\theta = 45.000000°$)
$r_4 = 81.74063$ (2)   $d_4 = 23.000000$   $n_{d3} = 1.525400$   $v_{d3} = 56.3$
(Aspheric)
$r_5 = \infty$ (Aspheric)   $d_5 = 5.902159$
$r_{10} = \infty$ (1)
Aspherical Coefficients 4th surface K = 0.000000
A = B = C = 0
D = 0.299171 × 10⁻¹⁴
5th surface K = 0.000000
A = 0.587853 × 10⁻⁵
B = 0.837441 × 10⁻⁷
C = D = 0
Example 6

$r_0 = \infty$ (Object Plane)   $d_0 = -1000.000000$
$r_1 = \infty$ (4)   $d_1 = 20.000000$
$r_2 = 70.19917$   $d_2 = 15.000001$   $n_{d1} = 1.525400$   $v_{d1} = 56.3$
$r_3 = \infty$ (3)   $d_3 = -15.000001$   $n_{d2} = 1.525400$   $v_{d2} = 56.3$
($\theta = 45.000000°$)
$r_4 = 80.07065$ (2)   $d_4 = 26.500000$   $n_{d3} = 1.525400$   $v_{d3} = 56.3$
$r_5 = \infty$ (Aspheric)   $d_5 = 3.495833$
$r_{10} = \infty$ (1)

-continued

Aspherical Coefficients

5th surface

K = −1.000000
A = 0.852957 × $10^{-4}$
B = 0.132225 × $10^{-6}$
C = −0.458379 × $10^{-9}$
D = 0

Example 7

| | | | |
|---|---|---|---|
| $r_0 = \infty$ (Object Plane) | $d_0 = -1000.000000$ | | |
| $r_1 = \infty$ (4) | $d_1 = 20.000000$ | | |
| $r_2 = 66.16270$ | $d_2 = 14.000000$ | $n_{d1} = 1.525400$ | $v_{d1} = 56.3$ |
| $r_3 = \infty$ (3) | $d_3 = -14.000000$ | $n_{d2} = 1.525400$ | $v_{d2} = 56.3$ |
| ($\theta = 45.000000°$) | | | |
| $r_4 = 86.34040$ (2) | $d_4 = 24.000000$ | $n_{d3} = 1.525400$ | $v_{d3} = 56.3$ |
| $r_5 = \infty$ (Aspheric) | $d_5 = 6.065328$ | | |
| $r_{10} = \infty$ (1) | | | |

Aspherical Coefficients

5th surface

K = −1.000000
A = 0.176495 × $10^{-4}$
B = C = D = 0

Example 8

| | | | |
|---|---|---|---|
| $r_0 = \infty$ (Object Plane) | $d_0 = -1000.000000$ | | |
| $r_1 = \infty$ (4) | $d_1 = 20.000000$ | | |
| $r_2 = 18.04461$ | $d_2 = 5.000000$ | $n_{d1} = 1.846658$ | $v_{d1} = 23.9$ |
| $r_3 = 12.03621$ | $d_3 = 8.000000$ | $n_{d2} = 1.620411$ | $v_{d2} = 60.3$ |
| $r_4 = -29.43062$ | $d_4 = 15.050168$ | | |
| (Aspheric) | | | |
| $r_{10} = \infty$ (1) | | | |

Aspherical Coefficients

4th surface

K = −1.000000
A = 0.500369 × $10^{-4}$
B = −0.261038 × $10^{-7}$
C = D = 0

As has been described above, it is possible according to the present invention to provide a compact, lightweight and wide-field head-mounted image display apparatus which has a device for making the image of the periphery of the image display device unsharp, and which is capable of projecting an image overflowing with dynamic presence.

What we claim is:

1. An Image display apparatus comprising:
    an apparatus body unit including an image device; and
    a support member which enables said apparatus body unit to be fitted to an observer's face or head,
    said apparatus body unit comprising an ocular optical system for leading an image displayed by said image display device to an eyeball of an observer who is fitted with said apparatus body unit, and contrast reducing means whereby a contrast of a peripheral region of said image is made lower than a contrast of a central region of said image,
    wherein said contrast reducing means allows said image to become gradually darker from a predetermined position of said image display device as a distance therefrom increases toward a periphery of said image display device, thereby making an image of the periphery of said image display device unsharp,
    said contrast reducing means has a principal ray cutoff means for cutting off at least a principal ray in a ray bundle emanating from a most peripheral region of said image display device, said principal ray cut-off means being disposed at a position away from said image display device by a distance which is not shorter than a depth of focus, and
    said principal ray cutoff means has the following features:
        said principal ray cutoff means is disposed between said image display device and said ocular optical system,
        said principal ray cutoff means cuts off the principal ray from the most peripheral region of said image display device and transmits a marginal ray closer to a center of said image display device than said principal ray in said ray bundle emanating from the most peripheral region, and
        said principal ray cutoff means allows an image of said image display device over an area from the center to the periphery thereof to be led to said observer's eyeball through said ocular optical system, and the image of said periphery is made darker than the image of the center of said image display device.

2. An image display apparatus according to claim 1, wherein an image of said principal ray cut-off means which is formed by said ocular optical system lies at a position which is 25 millimeters or more away from said eyeball.

3. An image display apparatus according to claim 1, which satisfies the following condition:

$$|A-B| > 3 \ m^{-1}$$

where A ($m^{-1}$) is a position where an image of said image display device is formed by said ocular optical system, and B ($m^{-1}$) is a position where an image of said principal ray cut-off means is formed by said ocular optical system.

4. An image display apparatus according to claim 1, wherein said contrast reducing means has a ray bundle cutoff means for cutting off all of a ray bundle emanating from the most peripheral region of said image display device, said ray bundle cut-off means being disposed at a position away from said image display device by a distance which is not shorter than a depth of focus.

5. An image display apparatus according to claim 4, wherein said ray bundle cut-off means is disposed at a position which is $f^2/333$ (millimeters) or more away from said image display device, where f (millimeters) is a focal length of said ocular optical system.

6. An image display apparatus comprising:
    an apparatus body unit including an image device; and
    a support member which enables said apparatus body unit to be fitted to an observer's face or head,
    said apparatus body unit comprising
        an ocular optical system for leading an image displayed by said image display device to an eyeball of an observer who is fitted with said apparatus body unit,
        contrast reducing means whereby a contrast of a peripheral region of said image is made lower than a contrast of a central region of said image,
        illuminating means for illuminating said image display device, and
        illuminance reducing means disposed between said image display device and said illuminating means, said illuminance reducing means being arranged such that illuminance of light illuminating a peripheral region of said image display device is lower than illuminance of light illuminating a central region of said image display device,
    wherein said contrast reducing means allows said image to become gradually darker from a predetermined position of said image display device as a distance therefrom increases toward a periphery of said image display device, thereby making an image of the periphery of said image display device unsharp.

7. An image display apparatus according to claim 6, wherein said illuminance reducing means comprises a light-blocking member in which transmittance gradually decreases as a distance from a center thereof increases toward a periphery thereof.

8. An image display apparatus according to claim 6, wherein said illuminance reducing means is implemented by disposing said illuminating means away from said image display device by a distance at which said illuminating means generates illumination unevenness such that the periphery of said image display device is darker than the center thereof.

9. An image display apparatus comprising:

an apparatus body unit including an image display device; and a support member which enables said apparatus body unit to be fitted to an observer's face or head, said apparatus body unit comprising an ocular optical system for leading an image displayed by said image display device to an eyeball of an observer who is fitted with said apparatus body unit, wherein said ocular optical system has a configuration arranged to cut off at least a principal ray emanating from a most peripheral region of said image display device between a surface of said ocular optical system closest to said image display device and a surface of said ocular optical system closest to the observer's eyeball so that said principal ray does not reach the observer's eyeball, whereby when the observer sees said image, a contrast of a peripheral region of said image is lower than a contrast of a central region of said image, thereby making a boundary between an image display area and a non-image display area indistinct.

10. An image display apparatus according to claim 9, wherein said configuration of said ocular optical system is arranged such that an effective aperture of said ocular optical system is reduced to narrow a width of light led from said surface closest to said image display device to said surface closest to said observer's eyeball so that the principal ray emanating from the most peripheral region of said image display device falls outside said width of light, thereby being cut off.

11. An image display apparatus according to claim 9, wherein said ocular optical system has a mirror surface, said mirror surface having a mirror-coated reflecting surface in a central portion thereof and one of a transmitting surface and an absorbing surface formed in a portion surrounding said reflecting surface, so that the principal ray emanating from the most peripheral region of said image display device is cut off by said transmitting surface or absorbing surface.

12. An image display apparatus according to claim 10, wherein said ocular optical system has a prism member, said prism member having an effective aperture reduced so that the principal ray emanating from the most peripheral region of said image display device and entering said prism member exits from said prism member through a side surface thereof, thereby being cut off without reaching said observer's eyeball.

13. An image display apparatus according to claim 11, wherein said ocular optical system has a prism member, and said mirror surface is a concave mirror of said prism member.

14. An image display apparatus according to claim 11, wherein said ocular optical system has a prism member, and said mirror surface is a half mirror of said prism member.

15. An image display apparatus according to claim 12, 13 or 14, wherein said prism member has an entrance surface disposed closest to said image display device, an exit surface disposed closest to said observer's eyeball, a concave mirror, and a half-mirror, so that a principal ray emanating from a central region of said image display device passes through said entrance surface and further passes through said half-mirror and is then reflected by said concave mirror, and the reflected principal ray is reflected by said half-mirror and passes through said exit surface so as to be led to said observer's eyeball.

16. An image display apparatus according to any one of claims 1, 2 and 3 to 8, wherein said ocular optical system has a half-mirror and a concave mirror.

17. An image display apparatus according to any one of claims 1, 2 and 3 to 8, wherein said ocular optical system includes a prism having a half-mirror.

18. An image display apparatus according to any one of claims 1, 2, 3 to 8, and 9 to 14, wherein said prism is made of a plastic material.

19. An image display apparatus according to any one of claims 1, 2, 3 to 8, and 9 to 14, wherein one of an end surface of said prism which faces said image display device or a lens which is disposed between said image display device and said prism has an aspherical surface, said aspherical surface being designed so that negative power added increases as the distance from an optical axis increases toward a periphery as far as a predetermined position in an effective aperture region.

20. An image display apparatus according to any one of claims 1, 2, 3 to 8, and 9 to 14, wherein an eye relief of said ocular optical system is 20 millimeters or more.

21. An image display apparatus according to any one of claims 1, 2, 3 to 8, and 9 to 14, wherein said ocular optical system displays an outside-world image in such a manner that said outside-world image is superimposed on a periphery of the image of said image display device.

* * * * *